United States Patent [19]
Wang et al.

[11] Patent Number: 5,297,238
[45] Date of Patent: Mar. 22, 1994

[54] ROBOT END-EFFECTOR TERMINAL CONTROL FRAME (TCF) CALIBRATION METHOD AND DEVICE

[75] Inventors: Xuguang Wang; Walter E. Red, both of Provo; Peter H. Manley, Alpine, all of Utah

[73] Assignee: Cimetrix Incorporated, Orem, Utah

[21] Appl. No.: 752,790

[22] Filed: Aug. 30, 1991

[51] Int. Cl.$^5$ .................. G06F 15/46; G05B 19/42
[52] U.S. Cl. .................................. 395/94; 395/89; 395/86
[58] Field of Search ...................... 395/94, 89, 86

[56] References Cited

U.S. PATENT DOCUMENTS

| | | | |
|---|---|---|---|
| 4,017,721 | 4/1977 | Michaud | 395/94 |
| 4,595,989 | 6/1986 | Yasukawa et al. | 395/89 |
| 4,628,464 | 12/1986 | McConnell | 395/94 |
| 4,712,970 | 12/1987 | Nakamura et al. | 395/94 |
| 4,722,063 | 1/1988 | Yasukawa et al. | 395/86 |
| 4,727,471 | 2/1988 | Driels et al. | 395/94 |
| 4,757,458 | 7/1988 | Takemoto et al. | 395/89 |
| 4,815,006 | 3/1989 | Andersson et al. | 395/86 |
| 4,831,549 | 5/1989 | Red et al. | 395/89 |
| 4,835,710 | 5/1989 | Schnelle et al. | 395/86 |
| 4,969,108 | 11/1990 | Webb et al. | 395/86 |

OTHER PUBLICATIONS

"Calibration Control of Robot Vertical Assembly" Edward Red, Xuguang Wang, and Ed Turner.
"Off-Line Integration Techniques for Robot Path Planning" Xuguang Wang and W. Edward Red.
"Off-Line Integration Techniques for Robot Path Planning" A Thesis by Xuguang Wang.
"Quaternions Approach to Solve the Kinematic Equation of Rotation . . . " Jack C. K. Chou and M. Kamel.
"Calibration of Wrist-Mounted Robotic Sensors by Solving Homogeneous Transform Equations of the Form AX – XB", Yiu Cheung Shiu and Shaheen Ahmad.

Primary Examiner—Allen R. MacDonald
Assistant Examiner—George Davis
Attorney, Agent, or Firm—Thorpe, North & Western

[57] ABSTRACT

A method for calibrating a tool control frame (TCF) on a robot with respect to a known calibration reference claim (CRF), wherein the (CRF) is in rigid body relationship with a robot link. The method includes the steps of (a) attaching a sensory tool to the robot link, (b) calibrating the sensory tool with appropriate units of measurement, (c) identifying a calibration feature to be mapped by the sensory tool, (d) causing relative movement of the calibration feature within sensing range of the sensory tool, (e) recording robot configuration and pose as a first data record, (f) causing relative movement of the calibration feature and sensory tool along a known direction to a new position within sensing range, (g) recording configuration and pose as a second data record, and (h) applying coordinate transformations to the respective data records to generate a correct tool control frame (TCF) pose with respect to the (CRF).

10 Claims, 16 Drawing Sheets

TCF CALIBRATION FOR AXISYMMETRIC TOOL

STEP 1. ATTACH STYLUS INTERFACE UNIT TO TOOL.

STEP 2. POSITION DIGITIZING TABLET IN WORKSPACE IN NEAR-NORMAL RELATION TO STYLUS.

STEP 3. MOVE ROBOT TO NEAR THE CENTER OF THE DIGITIZING TABLET (CONFIGURATION 1).

STEP 4. RECORD STYLUS POSITION IN DIGITIZING TABLET FRAME AND RECORD ROBOT CONFIGURATION.

STEP 5. MOVE ROBOT TO A SECOND CONFIGURATION ALONG THE X-AXIS AND WITHIN ACTIVE AREA OF DIGITIZING TABLET (CONFIGURATION 2).

STEP 6. RECORD STYLUS POSITION IN DIGITIZING TABLET FRAME AND RECORD SECOND ROBOT CONFIGURATION.

STEP 7. MOVE ROBOT TO A THIRD CONFIGURATION IF NECESSARY TO OBTAIN A NEW ROBOT ORIENTATION WITHIN THE ACTIVE AREA OF TABLET.

STEP 8. RECORD STYLUS POSITION AND ROBOT CONFIGURATION.

STEP 9. PROCESS TRANSFORMATIONS TO GENERATE TCF CALIBRATION.

*Fig. 7*

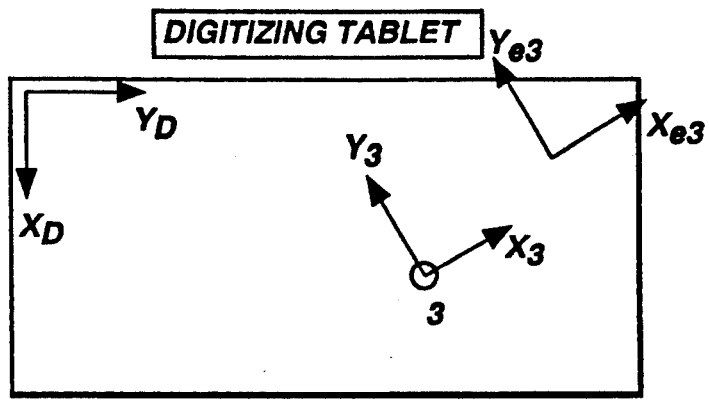
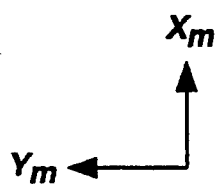
*Fig.10*
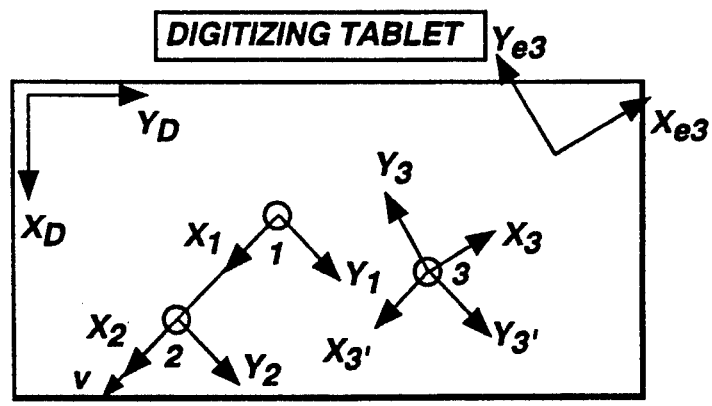
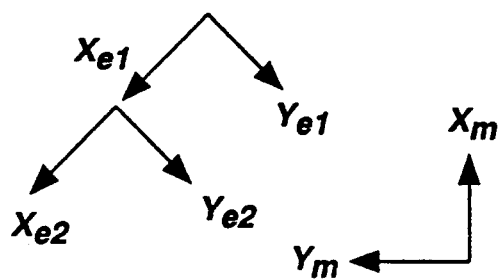
*Fig. 11*

TCF CALIBRATION FOR NON-AXISYMMETRIC TOOL

STEP 1. ATTACH TOOL TO BE CALIBRATED TO THE ROBOT LINK.

STEP 2. SELECT STYLUS ADAPTOR FOR TOOL

STEP 3. ACTIVATE TOOL WITH RESPECT TO STYLUS ADAPTOR (GRASP ADAPTOR WITH TOOL) TO POSITION IN "NORTH" DIRECTION.

STEP 4. PROCESS CALIBRATION PROCEDURES TO DETERMINE "NORTH" POSITION RELATIVE TO THE LINK FRAME.

STEP 5. RELEASE THE ADAPTOR FROM TOOL.

STEP 6. ACTIVATE TOOL WITH RESPECT TO STYLUS ADAPTOR TO POSITION IN "SOUTH" DIRECTION.

STEP 7. PROCESS CALIBRATION PROCEDURES TO DETERMINE "SOUTH" POSITION RELATIVE TO THE LINK FRAME.

STEP 8. RELEASE THE ADAPTOR FROM THE TOOL.

STEP 9. PROCESS DATA TO GENERATE TCF CALIBRATION.

*Fig. 13*

TCF CALIBRATION FOR NON-ORTHOGONAL CAMERA

STEP 1. PLACE CALIBRATION TEMPLATE <u>WITH FEATURE</u> IN ROBOT WORKSPACE.

STEP 2. ADJUST CAMERA TO NEAR-NORMAL ORIENTATION WITH RESPECT TO THE CALIBRATION SURFACE AND WITH THE FEATURE (CONFIGURATION 1) WITHIN THE VISION WINDOW.

STEP 3. PROCESS IMAGE IN VISION COORDINATE FRAME TO OBTAIN FEATURE POSE FRAME AND RECORD ROBOT CONFIGURATION.

STEP 4. MOVE SUCH THAT THE CAMERA IS NEAR NORMAL TO THE CALIBRATION SURFACE AND THE FEATURE IS WITHIN THE VISION WINDOW AT A DIFFERENT POSE (CONFIGURATION 2).

STEP 5. PROCESS IMAGE TO DEFINE FEATURE POSE AND RECORD ROBOT CONFIGURATION.

STEP 6. APPLY TRANSFORMATIONS TO COMPLETE TCF CALIBRATION.

*Fig. 17*

TCF CALIBRATION OF WELDING TIP

STEP 1. ATTACH WELDING GUN TO BE CALIBRATED TO A ROBOT LINK.

STEP 2. POSITION CALIBRATION TEMPLATE INCLUDING CALIBRATION HOLES IN WORKSPACE.

STEP 3. MOVE ROBOT WITH WELDING TIP TO A CENTERED POSITION AT A CALIBRATION HOLE (CONFIGURATION 1).

STEP 4. RECORD ROBOT CONFIGURATION.

STEP 5. MOVE ROBOT TO ANOTHER CONFIGURATION WHILE RETAINING THE WELDING TIP CENTERED AT THE CALIBRATION HOLE AS IN STEP 3.

STEP 6. RECORD ROBOT CONFIGURATION.

STEP 7. PROCESS TRANSFORMATIONS TO COMPLETE TCF CALIBRATIONS.

*Fig. 22*

TABLE 1. TCF CALIBRATION RESULTS FOR A VISION CAMERA

| TEST NO | X (mm) | Y (mm) | $\theta$ (degree) |
|---|---|---|---|
| 1 | -46.350300 | -88.038078 | -27.048596 |
| 2 | -46.356750 | -88.047714 | -26.946753 |
| 3 | -46.359779 | -88.046516 | -26.797978 |
| 4 | -46.354568 | -88.052582 | -27.017435 |
| 5 | -46.348026 | -88.066490 | -26.997996 |
| 6 | -46.363510 | -88.061516 | -26.992614 |
| 7 | -46.362331 | -88.056442 | -26.852039 |
| 8 | -46.364265 | -88.041992 | -26.900480 |
| 9 | -46.353237 | -88.046227 | -26.961149 |
| 10 | -46.357750 | -88.059761 | -27.009386 |
| AVERAGE | -46.357052 | -88.051732 | -26.952443 |
| STANDARD DEVIATION | 0.005264 | 0.008692 | 0.075597 |

*Fig. 25*

TABLE 2. TCF CALIBRATION RESULTS FOR A VACUUM GRIPPER

| TEST NO | X (mm) | Y (mm) | TEST NO | X (mm) | Y (mm) |
|---|---|---|---|---|---|
| 1 | -54.047077 | -17.161591 | 6 | -54.137531 | -17.248152 |
| 2 | -54.063084 | -17.177086 | 7 | -54.123566 | -17.174816 |
| 3 | -54.048439 | -17.152706 | 8 | -54.116657 | -17.165077 |
| 4 | -54.140965 | -17.193359 | 9 | -54.066551 | -17.164625 |
| 5 | -54.085217 | -17.215057 | 10 | -54.066856 | -17.141228 |

AVERAGE: $X_{av} = -54.089594$  $Y_{av} = -17.179370$
STANDARD DEVIATION: $X\sigma = 0.034777$  $Y\sigma = 0.030215$

*Fig. 26*

ROBOT END-EFFECTOR TERMINAL CONTROL FRAME (TCF) CALIBRATION METHOD AND DEVICE

BACKGROUND OF THE INVENTION

1. Field of the Invention

This invention pertains to methods and devices for enabling off-line programming of robot tasks. More particularly, the present invention relates to a method of mapping and correcting for robot inaccuracy.

2. Prior Art

Robot mechanisms are being increasingly used within the manufacturing industry for performing repetitive tasks in an assembly line configuration. In recent years much emphasis has been placed on robot off-line programming. The benefits of a true off-line system are substantial. Off-line programming and robot task simulation allow the user to verify robot tasks before purchasing costly equipment, thus insuring that the proper robot has been chosen for the task.

When several robots are to perform the same or similar task, off-line programming allows the task to be planned once, with the resulting program being applied to each separate robot. Minor changes in a robot's program are then easily handled without the customary down-time of on-line programming. When properly coupled with robot sensor systems, off-line programming can put the flexibility into robot workcells that has long been promised, but seldom realized.

Such flexibility could allow robot systems to respond to task operations that have heretofore been uneconomical such as "Parts on Demand" manufacturing schemes and random part presentations. If parts are allowed to arrive at robot workcells with random position and/or orientation, much of the need for costly jigs and fixturing could be eliminated. Such fixturing is not only expensive, but very time consuming. It represents one of the major hurdles against making robot workcells flexible.

Although off-line programming offers many benefits, industry has been slow to adopt this method of workcell operation. A major reason for minimal progress has been the inadequacy of compensation and control of robot inaccuracy. Commercial off-line programming packages show beautifully animated models of robot workcells simulated on engineering graphics workstations, but when the final product is down-loaded to the robot workcell, the robot is unable to perform the desired task with sufficient accuracy to be useful. The result is that, although the logic of a robot program can be developed off line, the actual robot configurations must be retaught on-line in a traditional teach pendant mode.

To further compound the problem, some robot configurations simply cannot be taught with a teach pendant system. An example of such a configuration is the placement of a part relative to some established datum but where no physical markings are available to guide the robot programmer. In this instance, the ability of the robot to move accurately is imperative to the ability of the robot to perform the task.

An understanding of the problems of accuracy and repeatability will be helpful for an appreciation of the solution presented by the invention disclosed herein. The concept of "repeatability" centers on the ability of a robot to move to the same position time after time, always within acceptable tolerances. "Accuracy", on the other hand, is the ability to directly move to a desired position upon an absolute command. By way of illustration, a repeatable archer will always shoot arrows in a very tight pattern on his target. However, this repeatability will be of little value unless that tight pattern is accurately near the bullseye.

Quality robot mechanisms are generally very repeatable in that they can consistently retrace movement patterns. Unfortunately, most robots are inherently inaccurate. This inaccuracy may be categorized in four major areas:

1. Robot technical imperfections
2. Robot tool calibration error
3. Rigid body error
4. Robot tip deflections due to load The technical imperfections stem from both the manufacturing processes resulting in tolerance stackup, joint misalignments, etc., and from natural wear of mechanical parts such as bearings. This is controlled by careful machine and design work. Robot tool calibration error is the result of not knowing where a robot's tool control frames (referred to herein as the TCF) are located relative to the robot's link frame. This is discussed in greater detail hereafter.

The third category of rigid body error is not really robot inaccuracy, but since the resulting error is the same, it is often grouped with robot inaccuracy. It is actually the error associated with not knowing the exact location of the parts that the robot is to operate on relative to the robot's base frame. The final category of "tip deflections" is obviously a function of load control and is controlled by task operation planning and engineering design of the robot load capacity.

The traditional solution to the inaccuracy issue is the teach pendant. The teach pendant circumvents the inaccuracy issue by relying on the inherent repeatability of robots. When a robot is taught a configuration using a teach pendant, it usually stores the encoder values of each joint motor at the desired robot configuration (a measurement of how many revolutions the motor has made from some known zero position). To return to that configuration, the robot need only command each motor to return to those saved encoder values. The robot need not even know where its tool is located in space, nor the part. Consequently, even inaccurate robots are often very repeatable.

However, teach pendant has little flexibility. If the robot is able to return to its exact prior position, but the part has not been positioned exactly, the robot may be useless. Accordingly, when a robot is programmed off-line, the luxury of a teach pendant is lost. Instead of repeatability, the programmer must now rely on accuracy. At first this may appear to be a great liability, and indeed has been a complication for off-line programming; however, development of a method to command robot accurately in an off-line mode can quickly convert this liability to an asset.

An earlier attempt to resolve this "accuracy" problem associated with tool calibration was developed by several of the present inventors and is disclosed in U.S. Pat. No. 4,831,549. In addition to giving a more complete review of prior art robot programming (incorporated herein by reference), this patent taught the use of a pointer tool as the solution to accurate calibration for the location and orientation of tools and sensors attached to the robot. The method involved defining a relationship between the last joint frame LJF and the pointer tool. A stylus associated with the tool was carefully lined up with the z axis of the LJF. The stylus was then moved to a known feature such as a grid marking on a template. This was identified as point one. The position of the robot with the stylus at this location was then recorded. Each tool to be calibrated was then moved to this exact position at point one and the respective robot configurations were again recorded. The difference between the stylus position and the respective tool positions provided the offset values to correct inaccuracy. Multiple points were used to develop a statistical average of these x and y offsets. The z axis was likewise measured by determining tool height.

These methods for tool and sensor calibration were demonstrated to work, even in the presence of robot inaccuracy and operator visual positioning error, due to the statistical method applied. The disadvantages of the previous technology are that it is tedious and time consuming, and is subject to the operator's visual acuity, which limits its application in the manufacturing environment. To obtain good statistical accuracy, ten to twenty points would have to be processed. This involved meticulously jogging or moving the stylus to these respective exact points on the template, so that the stylus and point were in exact alignment. Then each of the tools had to be similarly moved, with robot configurations appropriately recorded. This method required hours of tedious effort, and could take days where multiple tools required calibration.

What was needed therefore, was an improved method and device which did not require the tedious alignment of a stylus with a calibration feature such as the referenced point on a template, but instead would involve a simple system of movements without the need for critical alignment.

OBJECTS OF THE INVENTION

It is an object of the present invention to provide a device and method for calibration of the TCF of a robot in a rapid manner that minimizes down time and enables application of off-line programming for virtually all robot task operations.

It is a further object to provide a device and method for calibrating tools and other end effectors associated with the TCF which can be quickly and effectively implemented.

It is yet another object of this invention to provide TCF calibration which facilitates adaptation of a server process to dissimilar program devices without complex interface programming as part of a robot control system.

It is a still further object of this invention to provide a calibrated TCF enabling interconversion of kinematic relationship of the end effector frame and the robot base frame.

Yet another object of this invention is to enable TCF calibration facilitated with software capable of automating the calibration process.

An additional object of this invention is to provide improved calibration of the TCF to enable operation of the robot on parts independent of their global location.

These and other objects are realized in a method and device for calibrating a tool control frame (TCF) of a robot with respect to a known calibration reference frame (CRF) attached to a robot link. The method comprises the steps of attaching a sensory tooling assembly to a robot link in a rigid body relationship. The CRF has a known positional and orientational relationship with respect to the robot base frame, which allows for feedback of positional and/or orientational information from a sensory reference frame associated with the sensory tooling attached to the robot link. Methods are provided for calibrating the sensory tooling assembly and any data output systems associated with the tooling assembly to enable sensor output in units capable of defining physical dimensions. After identifying a calibration feature separate from the robot which is capable of being mapped by the sensory tooling assembly, the next step involves causing relative movement between the calibration feature and sensory tooling assembly to bring the calibration feature within sensing range. This may be accomplished by automated search routines or by one jogging of the sensory tooling assembly to a calibration position with respect to the calibration feature. The robot configuration is then recorded, defining the location and orientation of the calibration feature with respect to the sensory reference frame as an initial configuration data record. This process is then repeated, causing relative movement between the calibration feature and sensory tooling assembly along a known direction such that the calibration feature and sensory tooling assembly are still within sensing range. The robot configuration and new relative location and orientation of the calibration feature with respect to the sensory reference frame are again recorded as a secondary configuration data record. It may be necessary to determine if the orientation of the secondary configuration is the same as the orientation of the initial configuration data record. If the orientation of the initial and secondary configurations are the same, an additional position and/or orientation change is required and is accomplished and recorded by causing relative movement of the calibration feature and the sensory tooling assembly such that the calibration feature has a different orientation from the orientation as determined in the initial and secondary data records, and recording robot configuration and new relative location and orientation of the calibration feature with respect to the sensory reference frame as a third configuration data record. In either case, the actual calibration determination is made by applying coordinate transformations to the initial and secondary configuration data records, and to the third configuration data record if required, to generate a correct terminal control frame (TCF) pose with respect to the CRF. These steps can be repeated several times to develop a statistical average of data representing a more accurate definition of pose for the TCF. A complement of tools is disclosed which collectively comprise the device for implementing these procedures.

Other objects and features of the present invention will be apparent to those skilled in the art, based upon the following detailed description and accompanying drawings.

DESCRIPTION OF THE DRAWINGS

FIG. 7 provides a procedural flow chart illustrating the TC calibration for an axisymmetric tool.

FIG. 10 shows a third configuration for the TCF calibration procedures for an axisymmetric tool.

FIG. 11 graphically illustrates the merger of configurations shown in FIGS. 8, 9 and 10.

FIG. 13 illustrates a flow chart setting forth TCF calibration procedures with respect to the non-axisymmetric tool.

FIG. 17 sets forth a flow chart representing procedural steps for calibration of a non-orthogonal vision camera.

FIG. 22 sets forth the procedures in flow chart form for determining the position of a welding tip.

FIG. 25 shows a table of TCF calibration results for a vision camera.

FIG. 26 shows a table of TCF calibration results for a vacuum gripper.

DETAILED DESCRIPTION OF THE PREFERRED EMBODIMENT

Figure 1:
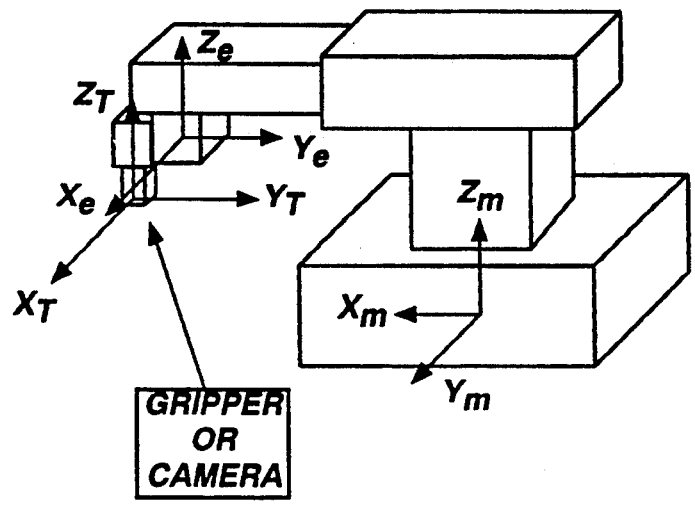
FIG. 1 shows a graphic representation of a robot with illustration of relevant frames of reference identified.

The design and control system implemented with the present invention successfully addresses the robot inaccuracy issue, within the structure of an integrated off-line programming system. Accuracy correction algorithms have been shown to significantly reduce robot inaccuracy to levels at or near the robot's repeatability. This procedure is generally described as follows.

The first step is to develop a model of the robot and its workcell. The inventive system allows the user to develop libraries of robots, tools, parts, etc. The workcell model is stored in a geometric database. This database is controlled by a main server process, which coordinates all system activity. The model can be displayed on the engineering workstation graphics monitor as a full color, solid-model, animated representation of the workcell. Desired logic and motion sequences for the robots and other controllable devices may be programmed in a standard computer language such as "C". A set of high-level, device-independent routines is used to simplify programming. All robots, robot components, end effectors, and parts are referred to by name as defined in the geometric database. This allows the engineer to focus on movement of the end effectors of the robot or basic device processes, not on individual robot element movements or on the detailed syntax of a programming language.

The control programs operate as client processes communicating with the server. Motion commands are sent by the control programs to the server, which compensates for robot inaccuracy and forwards the commands to either the simulation system or to the robot controller.

The present invention gives the automation engineer the capability to control dissimilar programmable devices without dealing with the proprietary languages, operating systems and development environments of these often diverse types of equipment. For example, an engineer could control a workcell composed of multiple robots (even from different vendors), conveyor systems, test equipment, and specialized automation equipment from the same cell controller, without programming in the native language of any of those devices. Each device is controlled via a simple device interface. There is no need to fully translate a control program into the native device controller language.

These different components can be filed together as a complete workcell or filed separately for later use. All components of a workcell are arranged in a hierarchy. Since the position of each element is stored relative to its immediate ancestor, the position of any group of elements and at any level in the hierarchy, can be quickly changed simply by changing the location of the parent element.

Once the workcell has been modeled, the robot must be taught configurations. Instead of storing joint values or global positions, the inventive system incorporates a database containing the information so that the robot can operate on parts independent of their global locations. This information consists of a tool frame or terminal control frame TCF attached to the robot, and a part frame attached to the object of interest (an optional offset position and orientation can also be included). In this manner the programmer need not know exactly where the parts will be located when the robot actually operates on them.

To achieve the desired accuracy, the present system uses sensors as part of a sensor tool assembly attached to the robot, such as a machine vision system and a touch probe. These sensors, along with the rest of the robot's tools must be calibrated so that their positions and orientations (poses) are known very accurately relative to the robot's link frame. The present system can be implemented with software that aids the user in this calibration and automates the procedure.

These sensors accomplish two tasks. First the sensors are used to *locate the poses of workcell objects* relative to the robot (a process usually labeled rigid body correction). The new positions of these parts are then fed back to the computer database, where all of the necessary corrections are made. Due to the hierarchical nature of the data structure, only a few primary or parent frames need to be measured and corrected. Any parts or frames located below these principle frames will be automatically moved with the parent frame.

Next, the sensors are used to *map the inaccuracy of the robot* in specific areas of the workcell. By letting the robot measure several features of known relative positions, and comparing where the robot thinks these features are located to their actual positions, a statistical mapping of the robot's inaccuracy in certain key areas of its working envelop is developed. In cases where the robot is to carry a heavy payload, the mapping procedures can be performed with an equivalent weight to account for any additional inaccuracy.

After calibrating the tool frames and locating the parts, the robot is ready to operate in the workcell. When actually commanded to move to a configuration taught off-line, the server calculates the ideal joint values necessary to position the calibrated tool frame at the corrected part frame. Based on the robots knowledge of its inaccuracy in the region of the part, additional corrections are made to these ideal joint values. These corrected joint values are then formatted correctly for the specific robot and down-loaded to the robot controller. If the process is repeatable the robot will work exactly as if the configurations had been taught on-line using traditional teach pendant methods. If, however, the process is non-repeatable, a rigid body correction can be made for each subsequent part.

The terminal or tool control frame (TCF) is a set of axes used to locate an end-effector attached to the link of a mechanism such as a robot (also referred to as the manipulator arm or just manipulator). Typical end-effectors include tools such as a vacuum gripper used for pick/place operations and measurement devices such as a vision camera used to sense workspace part geometry or part locations. The determination of the end-effector TCF is hereafter referred to as TCF calibration. In this disclosure the TCF calibration methods are applicable to any mechanism capable of generating the motion sequences described herein, but, for convenience, are described herein as attached to a robot or manipulator link. A more detailed description of this general procedure for calibrating the TCF follows.

FIG. 1 graphically defines the relative frames used in TCF calibration, including the robot or manipulator base frame $(XYZ)_m$, the end-effector TCF frame $(XYZ)_T$, and the robot terminal frame or the robot last joint frame $(XYZ)_e$. Although we attach the end-effector to the last robot link, as is normally done, the procedures described herein are applicable for end-effectors attached to any other link of the robot if the mechanism joints and links interior to and including this link are capable of producing the desired sequence of motions. The CRF can be associated with any link having a known relationship to the base frame.

For any particular robot configuration the robot controller provides the pose (position and orientation) of the robot terminal frame $(XYZ)_e$ either in the robot base coordinate frame (Cartesian space) or in the form of robot joint values (robot joint space). The representations of the robot terminal frame in both spaces, Cartesian space and joint space, are convertible using either forward kinematics or inverse kinematics. For example, the robot terminal frame pose in joint space can be easily converted to Cartesian space using forward kinematics. The robot controller does not know where the attached end-effectors are, however. TCF calibration determines the relation between end-effector TCF frame $(XYZ)_T$ and the robot link frame $(XYZ)_e$ to which the end-effector is attached, and therefore makes the kinematic relationship of the end-effector to the robot base coordinate frame possible.

In teach pendent programming the robot only moves to taught configurations, not requiring knowledge of TCF pose. In contrast, robot off-line programming or on-line adaptive control (using sensor obtained measurement to make motion deviations) requires that the tool control frame (TCF) of the end-effectors be accurately known relative to the robot link to which they are attached, since the robot is commanded to move to poses that are either obtained from a database or generated from some sensor measurement.

The idea of applying robot relative movement in localized regions and statistical methods for TCF calibration works because the end-effector as a whole can be treated as a rigid body and the displacement of the tool to be calibrated from the robot last joint frame can be determined from the relative robot movement or the differences between the corresponding robot configurations. One of the major steps in TCF calibration is to establish a fixed relation between a robot and workspace environment. The automated TCF calibration procedures further allow more statistical data to be easily collected and processed, and therefore, provide faster calibration and improved measurement.

To explain all the necessary transformations and transformation equations used for automatic TCF calibration, the following convention regarding the homogeneous transformation between two space frames will be used throughout this document. A bold face letter T with superscript a and subscript b, or $T_b^a$, represents the homogeneous transformation that locates frame $(XYZ)_a$ relative to frame $(XYZ)_b$. This four by four homogeneous transformation can further be represented as the combination of a three by three rotational submatrix and a position vector, equation (1).

$$\text{where: } T_b^a = \begin{bmatrix} n_x & o_x & a_x & p_x \\ n_y & o_y & a_y & p_y \\ n_z & o_z & a_z & p_z \\ 0 & 0 & 0 & 1 \end{bmatrix} = \begin{bmatrix} R_b^a & P_b^a \\ 0 & 1 \end{bmatrix} \quad (1)$$

$$\text{rotation submatrix: } R_b^a = \begin{bmatrix} n_x & o_x & a_x \\ n_y & o_y & a_y \\ n_z & o_z & a_z \end{bmatrix} \quad (2)$$

$$\text{position vector: } p_b^a = \begin{bmatrix} p_x \\ p_y \\ p_z \end{bmatrix} \quad (3)$$

$$\text{zero vector transpose: } 0 = [0\ 0\ 0] \quad (4)$$

Although described for a camera, the TCF calibration methods presented are applicable for other sensors which are capable of measuring the relative motion of part geometry and/or part locations. When a vision camera is attached to the robot distal link and used to monitor part pose (position and orientation) deviations, its coordinate frame needs to be calibrated relative to the link frame to which it is attached, typically the robot distal (last) joint frame, also referred to as the tool interface frame (TIF).

In one embodiment, we will first introduce some of the characteristics of a vision camera. Then we will present methods to calibrate some of the internal parameters of a vision camera such as pixel aspect ratio and pixel size. Automatic TCF calibration procedures and integrated vision camera calibration procedures will be presented after that.

A vision camera is a non-contact measurement device which has the capability of digitizing vision images and can be used to produce following information:
position of a stationary object
object orientation
object identification
object tracking as a function of time
defect recognition and object inspection
In this disclosure we are interested in the ability of a vision system to determine object position and object orientation.

Most vision images are broken down into a rectangular array or matrix of pixels, with each pixel capable of recording a discrete (digital or integer) intensity from the scene being imaged. This pixel information must then be mapped into physical dimensions for the purpose of object pose (position and orientation) measurement and feature recognition. This requires that the pixel sizes be calibrated, which process can be separated into two parts: pixel aspect ratio calibration and pixel size calibration.

Pixel Aspect Ratio Calibration

In a vision imagery matrix, the pixel size in the X axis direction of the vision coordinate frame is often different from that in the Y axis direction. The ratio of the pixel size in X direction to the pixel size in Y direction is defined as the pixel aspect ratio, equation (5).

$$\text{pixel aspect ratio} = \frac{\text{pixel size in } X \text{ direction}}{\text{pixel size in } Y \text{ direction}} \quad (5)$$

The pixel aspect ratio can be used to scale the pixels in both X and Y directions for accurate image processing, such as center determination of a blob image.

Figure 2:
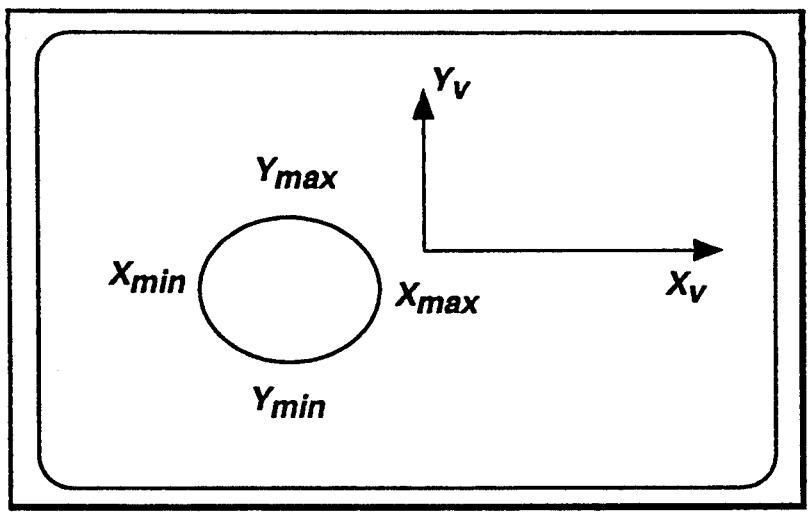
FIG. 2 graphically depicts a blob (the image of a feature for illustrating calibration.

It is relatively straight forward to calibrate the pixel aspect ratio. Take a picture (obtain the image) of a circular dot of diameter d (inches or mm), as shown in FIG. 2, then process the image and determine the extreme pixel coordinates $X_{max}$, $X_{min}$, $Y_{max}$, and $Y_{min}$. The pixel aspect ratio can now be determined as:

$$\text{pixel aspect ratio} = \frac{\frac{d}{X_{max} - X_{min}}}{\frac{d}{Y_{max} - Y_{min}}} = \frac{Y_{max} - Y_{min}}{X_{max} - X_{min}} \quad (6)$$

Pixel Size Calibration

Pixel size is defined as the ratio of the actual size (distance) of a feature to the pixel size (distance) of the same feature, and can be determined by equations (7) and (8), see FIG. 2.

$$\text{pixel size in } X \text{ direction} = \frac{d}{X_{max} - X_{min}} \quad (7)$$

$$\text{pixel size in } Y \text{ direction} = \frac{d}{Y_{max} - Y_{min}} \quad (8)$$

With the pixel aspect ratio determined the pixels can be scaled such that they are uniform in both X and Y direction. The pixel sizes for scaled X and Y direction are now uniform, and can be calibrated by two vision sensitive dots, (9).

$$\text{scaled pixel size} = \quad (9)$$

$$\frac{\text{actual distance between the two dots(in. or mm)}}{\text{scaled pixel distance between the two dots}}$$

With scaled pixel size known the pixel sizes in both X and Y direction are readily available, equations (10) and (11).

$$\text{pixel size in } X \text{ direction} = (\text{scaled pixel size}) * (\text{pixel aspect ratio}) \quad (10)$$

$$\text{pixel size in } Y \text{ direction} = \text{scaled pixel size} \quad (11)$$

Automatic TCF Calibration for a Vision Camera

Figure 3:
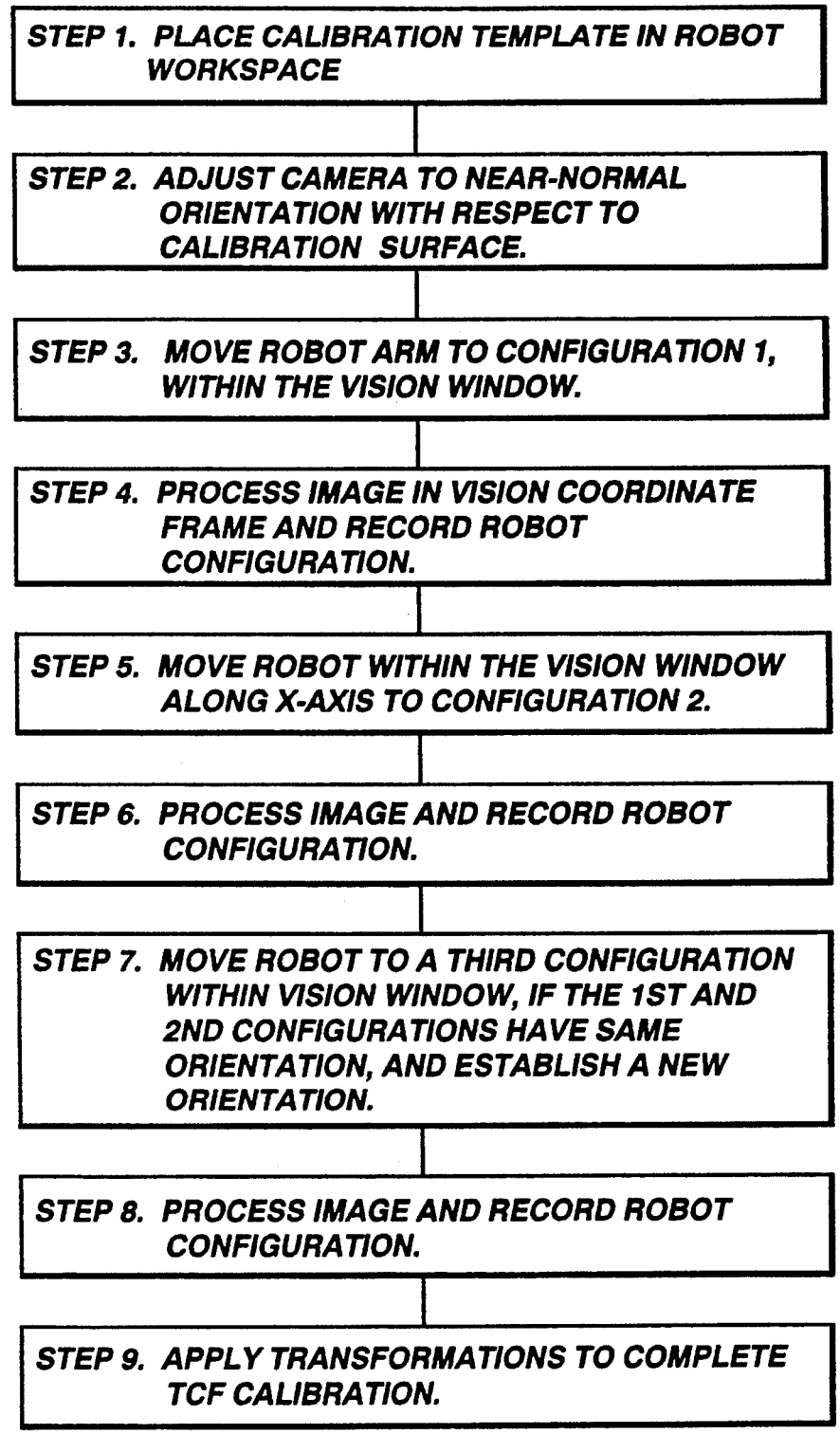
FIG. 3 is a flow chart illustrating TCF calibration for a vision camera.

The automatic TCF calibration procedures presented in this disclosure only require a single vision sensitive blob feature which will hereafter be referred to simply as a dot or calibration dot. The calibration dot will provide a reference point in the robot workspace for relative robot end-effector movement in localized regions. The relative motion of the robot is then used to calibrate the relative rigid displacement between the camera coordinate frame and the robot link frame to which the sensor is attached. The TCF calibration operation (FIG. 3) proceeds as follows:

1. We assume that the vision camera to be calibrated is attached to the robot link.

2. Place a calibration plate or template having calibration dots (features) in the robot workspace.

3. Adjust the camera such that the camera is near normal to the calibration surface. Camera orthogonalization routines may be activated for high tolerance applications.

4. Move the robot arm to a position such that the calibration dot will appear near the center of the vision window. We will call this configuration 1, see FIG. 4.

5. Activate the vision system to take a picture of the calibration dot and process the image, record the dot coordinate $(X_{v1}, Y_{v1})$ in the vision coordinate frame (XYZ) at configuration 1.

6. Record current robot configuration in the form of a set of joint angles or a homogeneous transformation relating the last joint frame $(XYZ)_e$ to the robot base frame $(XYZ)_m$.

7. Move robot in the X-axis direction of its last joint frame. While moving the robot arm, make sure the dot is still inside the vision window. The dot is now in vision screen position #2. We will call this configuration 2, see FIG. 5.

8. Activate the vision system to take a picture and process the image; record the dot coordinate $(X_{v2}, Y_{v2})$ in the vision coordinate frame $(XYZ)_v$ at configuration 2.

Figure 6:
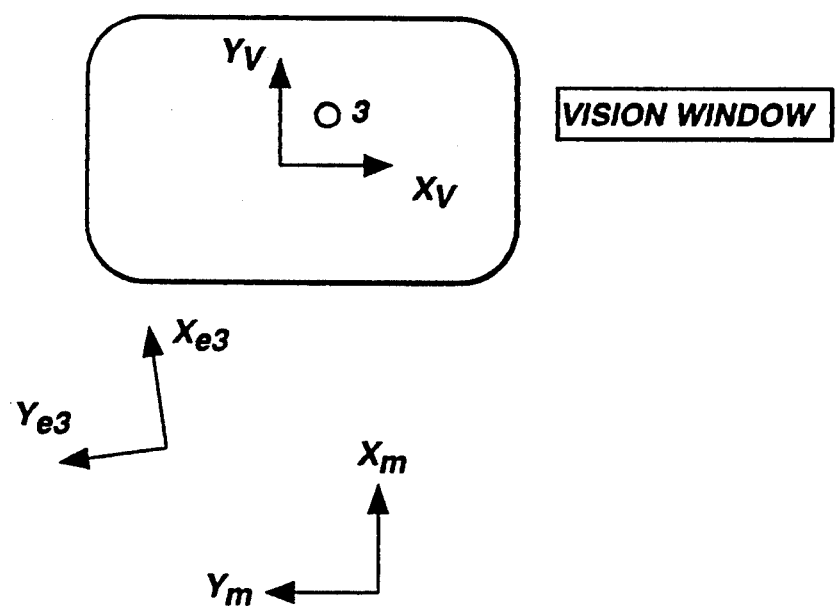
FIG. 6 represents a third configuration for the camera TCF calibration.

9. Move robot arm such that its last joint frame is at a different orientation from that of configuration 1. Make sure the calibration dot is inside the vision window. The dot is now at vision screen configuration 3, see FIG. 6. Initial calibration requires the robot to move relative to its last joint frame a small amount to guarantee that the dot is inside the vision window. Later calibration can move the robot relative to the initially calibrated vision camera frame, and guarantee that the dot is near the center of the vision window.

10. Activate the vision system to take a picture and process the image; record the dot coordinate $(X_{v3}, Y_{v3})$ in the vision coordinate frame $(XYZ)_v$ at configuration 3.

11. Record current robot configuration in the form of a set of joint angles or a homogeneous transformation relating the last joint frame $(XYZ)_e$ to the robot base frame $(XYZ)_m$.

12. Carry out TCF calibration calculation using data collected in steps 5, 6, 8, 10, and 11 and transformation methods as previously discussed.

Figure 4:
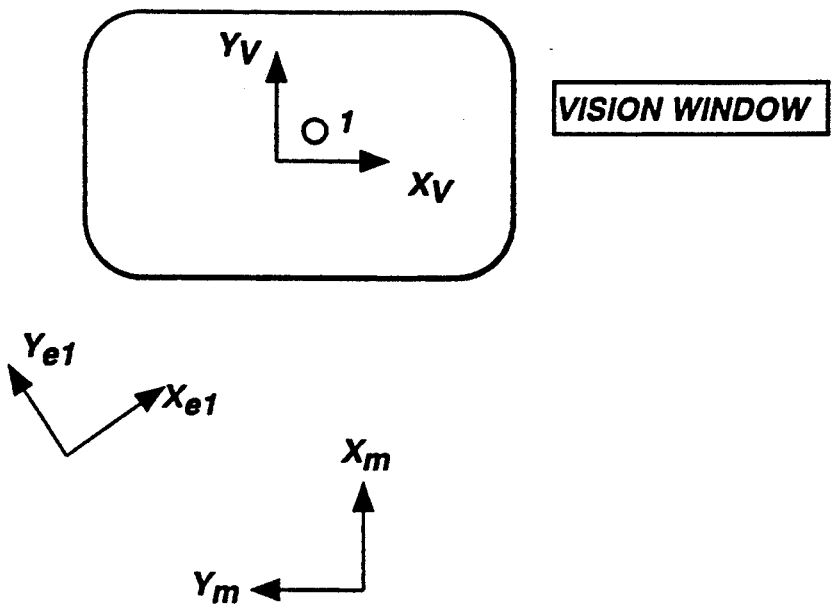
FIG. 4 graphically illustrates the first configuration of TCF calibration for the vision camera as procedurally set forth in FIG. 3.

From FIG. 4 the relative transformation of the calibration dot with respect to the robot base frame can be found, equation (12). The calibration dot can only define the origin of a dot coordinate frame whose orientation is arbitrary.

$$T_m^{dot} = T_m^1 = {}^1T_m{}^eT_e{}^vT_v^1 \quad (12)$$

Representing the transformations on the right side of equation (12) in the form of rotation submatrix and a position vector gives:

$$T_m^{dot} = \begin{bmatrix} {}^1R_m^e & {}^1p_m^e \\ 0 & 1 \end{bmatrix}\begin{bmatrix} R_e^v & p_e^v \\ 0 & 1 \end{bmatrix}\begin{bmatrix} R_v^1 & p_v^1 \\ 0 & 1 \end{bmatrix} \quad (13)$$

$$= \begin{bmatrix} {}^1R_m^eR_e^v & {}^1R_m^ep_e^v + {}^1p_m^e \\ 0 & 1 \end{bmatrix}\begin{bmatrix} R_v^1 & p_v^1 \\ 0 & 1 \end{bmatrix}$$

$$= \begin{bmatrix} {}^1R_m^eR_e^vR_v^1 & {}^1R_m^eR_e^vp_v^1 + {}^1R_m^ep_e^v + {}^1p_m^e \\ 0 & 1 \end{bmatrix}$$

Figure 5:
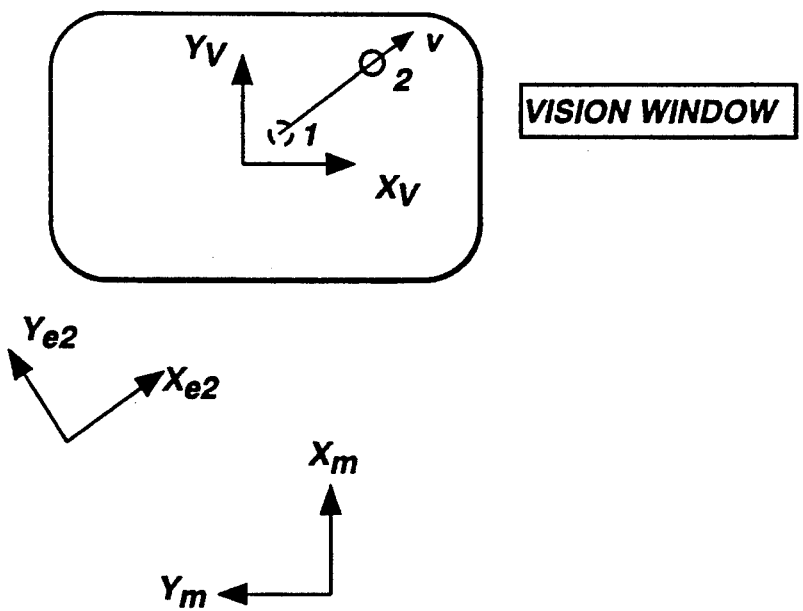
FIG. 5 illustrates the vision window with respect to the preceding TCF calibration for the vision camera, showing a second configuration.

Similarly, from FIG. 5 the relative transformation of the calibration dot with respect to the robot base frame can be found, see equation 14.

$$T_m^{dot} = T_m^3 = {}^3T_m{}^eT_e{}^vT_v^3 \quad (14)$$

$$= \begin{bmatrix} {}^3R_m^e & {}^3p_m^e \\ 0 & 1 \end{bmatrix}\begin{bmatrix} R_e^v & p_e^v \\ 0 & 1 \end{bmatrix}\begin{bmatrix} R_v^3 & p_v^3 \\ 0 & 1 \end{bmatrix}$$

$$= \begin{bmatrix} {}^3R_m^eR_e^v & {}^3R_m^ep_e^v + {}^3p_m^e \\ 0 & 1 \end{bmatrix}\begin{bmatrix} R_v^3 & p_v^3 \\ 0 & 1 \end{bmatrix}$$

$$= \begin{bmatrix} {}^3R_m^eR_e^vR_v^3 & {}^3R_m^eR_e^vp_v^3 + {}^3R_m^ep_e^v + {}^3p_m^e \\ 0 & 1 \end{bmatrix}$$

Notice that even though the calibration dot appears in different positions 1, 2, and 3 in the vision window, it is fixed in world space and fixed relative to the robot base frame $(XYZ)_m$ during the calibration process. The position components of equations (13) and (14) are, therefore, equal.

$${}^1R_m^eR_e^vp_v^1 + {}^1R_m^ep_e^v + {}^1p_m^e = {}^3R_m^eR_e^vp_v^3 + {}^3R_m^ep_e^v + {}^3p_m^e \quad (15)$$

Rearranging (15) gives:

$$({}^1R_m^e - {}^3R_m^e)p_e^v = {}^3R_m^eR_e^vp_v^3 - {}^1R_m^eR_e^vp_v^1 + {}^3p_m^e - {}^1p_m^e \quad (16)$$

Since the robot is moved in its last joint X-axis direction in automatic TCF calibration step 7, vector v formed by calibration dot images 1 and 2 on the vision window has the same orientation as that of the X-axis direction of the robot last joint frame $(XYZ)_e$. Therefore, the relative orientation between the vision coordinate frame $(XYZ)_v$ and the robot last joint frame $(XYZ)_e$ is readily available, equations (17) and (18).

$$R_e^v = \begin{bmatrix} \cos\theta & \sin\theta & 0 \\ -\sin\theta & \cos\theta & 0 \\ 0 & 0 & 1 \end{bmatrix} \quad (17)$$

where:

$$\theta = \tan^{-1}\left(\frac{Y_{v2} - Y_{v1}}{X_{v2} - X_{v1}}\right) \quad (18)$$

Knowing $R_e^v$, the orientation components of the vision camera TCF, equation [16] can then be solved for the position components of the TCF, namely, $P_e^v$.

Equation (16) suggests that to have a non-singular solution, ${}^1R_m^e$ and ${}^3R_m^e$ must be different. In other words, the robot last joint frame must have different orientations for configurations 1 and 3 in calibration steps 4 and 9.

Due to robot inaccuracy, vision system resolution and numerical roundoff, calibration steps 4 to 12 can be repeated a number of times to establish statistical certainty. The statistical average can then be used to predict more accurate TCF values and the standard deviations used to quantitatively verify the TCF calibration accuracy.

Integrated vision Camera Calibration

We have previously introduced methods for pixel aspect ratio calibration and pixel size calibration using a single circular dot, FIG. 2. The calibration accuracy, however, depends on the manufacturing tolerance and roundness of the calibration dot. To have a better calibration result statistical averaging methods must be applied. This implies that a number of calibration measurements must be made on the given calibration dot with different measurement angles. A statistical base of pixel calibrations can then be built. To automate the processes of moving the vision camera around the given calibration dot, vision camera TCF needs to be known a priori. On the other hand, pixel aspect ratio and pixel sizes ar required in the automatic vision camera TCF calibration processes for determining poses of the calibration features. An integrated vision camera calibration strategy with recursive approach was invented to resolve this problem. The detailed procedures are presented next.

1. Develop initial calibration for the pixel aspect ratio and pixel sizes using a circular calibration dot with known diameter.

2. Update the vision system pixel parameters.

3. With the initial pixel calibration, automatic vision camera TCF calibration can be conducted to initially calibrate the vision camera TCF.

4. With the relatively accurate camera TCF the vision camera can now be commanded to move around the given calibration dot whose geometry has already been built in the workcell data base. Pixel calibration on each of the calibration measurement with a unique offset angle helps to build up a statistical base for a precise pixel calibration. The pixel parameters can now be statistically averaged.

5. Update the vision system with the new pixel parameters.

6. Conduct the automatic vision camera TCF calibration with the calibrated pixel parameters.

TCF CALIBRATION FOR AN AXISYMMETRIC TOOL

Axisymmetric tools such as vacuum grippers and depth probes do not have a unique orientation as far as the physical device is concerned. Therefore, TCF calibration of an axisymmetric tool only needs to determine its TCF origin relative to the robot link frame to which it is attached. Unlike a vision camera, there is no usable local coordinate system embodied in the axisymmetric tool for the tool TCF calibration. To effectively calibrate the axisymmetric tool an additional reference calibration frame must be established with the help of an external measurement device which has a local reference frame and has the capability of measuring relative changes in position and orientation of robot end-effectors or devices attached to the end-effectors. Typical examples of such measurement devices include a digitizing tablet, a vision camera, and a laser triangulation system. The reference calibration frame can then be utilized to trace the relative movement of the end effectors attached to a robot link.

The automatic TCF calibration procedures described herein employ a digitizing tablet and a contact or noncontact stylus. Even though a digitizing tablet is used to present the automatic TCF calibration methods, the method itself is general and is applicable to TCF calibration using any external measuring device that can measure relative motion.

A digitizing tablet is an electronic device that transmits the relative position of a stylus to software running on a host computer. Modern digitizing devices have resolution of 0.001 inches and accuracy of 0.01 inches or better. A stylus is also an electronic device which is used to activate digitizing tablet components for transmitting its coordinates on the tablet. A typical stylus is composed of an excitable LC circuit. The coordinate system attached internally in the digitizing tablet will be used as an intermediate reference calibration frame in the TCF calibration method to be introduced. Unique relative robot movements help establish closed loop transformation equations which are then solved for the tool TCF origin.

Since the TCF of an axisymmetric tool does not have a unique orientation, it will be convenient to assume that the TCF is parallel to the robot last joint frame $(XYZ)_e$. The detailed calibration procedures (FIG. 7) and equation derivation are presented here.

1. Assume that the axisymmetric tool to be calibrated is attached to the robot link either manually or through a tool changer.

2. Attach the stylus interface unit to the axisymmetric tool.

3. Place the digitizing tablet in an convenient and reachable location in the robot workspace.

4. Adjust the digitizing tablet such that it is near normal to the stylus.

Figure 8:
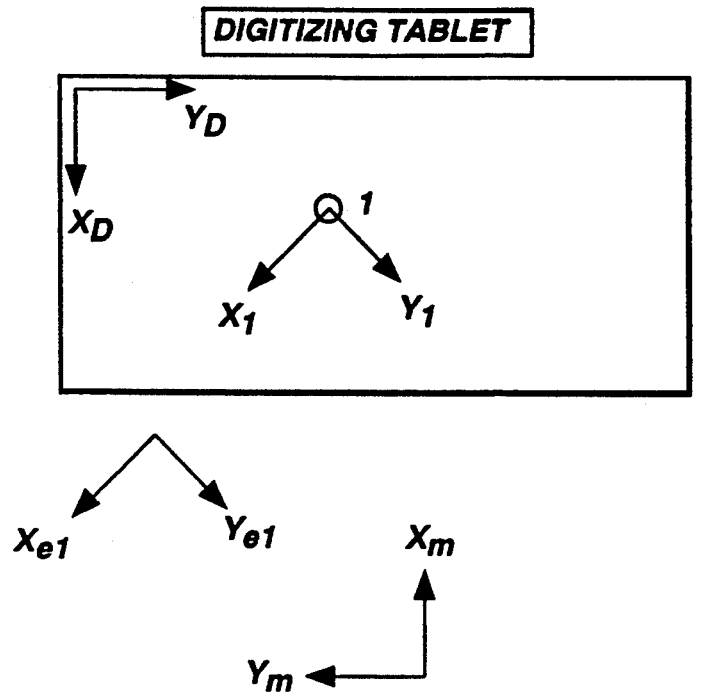
FIG. 8 graphically illustrates a first configuration for the TCF calibration procedures for the axisymmetric tool.

5. Move the robot such that the stylus is near the center of the digitizing tablet. We will call this configuration 1, FIG. 8.

6. Record the stylus position $(X_1, Y_1)$ in the digitizing tablet frame $(XYZ)_D$ at configuration 1.

7. Record current robot configuration in the form of a set of joint angles or a homogeneous transformation relating the last joint frame $(XYZ)_e$ to the robot base frame $(XYZ)_m$.

Figure 9:
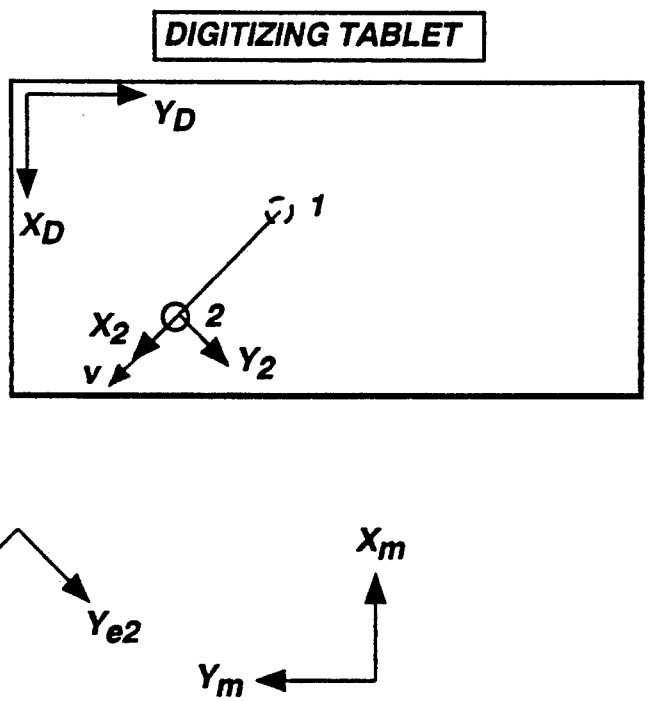
FIG. 9 shows a second configuration for the TCF calibration of the axisymmetric tool.

8. Move the robot in the X-axis direction of its last joint frame. While moving the robot arm, make sure the stylus is within the active area of the digitizing tablet. The stylus is now on the digitizing tablet at configuration 2, FIG. 9.

9. Record the stylus position $(X_2, Y_2)$ in the digitizing tablet frame $(XYZ)_D$ at configuration 2.

10. Move robot arm such that its last joint frame is at a different pose from that of configuration 1. Make sure the stylus is within the active area of the digitizing tablet. The stylus is now on the digitizing tablet at configuration 3, FIG. 10. Initial calibration requires the robot to move relative to its last joint frame a small amount to guarantee that the stylus is within the active area of the digitizing tablet. After an initial estimate, later calibration can move robot relative to the initially calibrated axisymmetric tool frame, and guarantee that the stylus remains close to the center of the digitizing tablet.

11. Record the stylus position $(X_3, Y_3)$ in the digitizing tablet frame $(XYZ)_D$ at configuration 3.

12. Record current robot configuration in the form of a set of joint angles or a homogeneous transformation relating the last joint frame $(XYZ)_e$ to the robot base frame $(XYZ)_m$.

13. Carry out TCF calibration calculation using data collected in steps 6, 7, 9, 11, and 12.

Notice that during the calibration processes the digitizing tablet stays fixed with respect to the robot base frame $(XYZ)_m$. This fact will allow us to merge configurations in FIGS. 8 to 10 into one configuration by matching frames $(XYZ)_D$ and $(XYZ)_m$, FIG. 11. To form the closed loop transformation equations for TCF calibration, an artificial frame $(XYZ)_e$, with the origin of frame $(XYZ)_3$ and orientation of frame $(XYZ)_1$ has been created.

The relative transformation between frame $(XYZ)_3$ and the robot base frame $(XYZ)_m$ can be represented in the following two ways:

$$T_m{}^{3'} = {}^1T_m{}^eT_e{}^1T_1{}^{3'} \tag{19}$$

$$T_m{}^{3'} = {}^3T_m{}^eT_e{}^3T_e{}^{3'} \tag{20}$$

The transformation from the axisymmetric tool $(XYZ)_1$ or $(XYZ)_3$ to the robot last joint frame $(XYZ)_e$ is a constant transformation because both frames are attached to the same rigid body. As a matter of fact, this is the TCF transformation to be calibrated.

$$T_e{}^1 = T_e{}^3 = T_e{}^{tcf} = \begin{bmatrix} R_e^{tcf} & p_e^{tcf} \\ 0 & 1 \end{bmatrix} = \begin{bmatrix} I & p_e^{tcf} \\ 0 & 1 \end{bmatrix} \tag{22}$$

Combining equations (21) and (22), and representing the transformations equation (21) in the form of rotation submatrices and position vectors gives:

$$\begin{bmatrix} {}^1R_m{}^e & {}^1p_m{}^e \\ 0 & 1 \end{bmatrix} \begin{bmatrix} I & p_e^{tcf} \\ 0 & 1 \end{bmatrix} \begin{bmatrix} I & p_1^{3'} \\ 0 & 1 \end{bmatrix} = \tag{23}$$

$$\begin{bmatrix} {}^3R_m{}^e & {}^3p_m{}^e \\ 0 & 1 \end{bmatrix} \begin{bmatrix} I & p_e^{tcf} \\ 0 & 1 \end{bmatrix} \begin{bmatrix} R_3^{3'} & 0 \\ 0 & 1 \end{bmatrix}$$

Multiplying the transformation matrix on both sides of the equation (23) gives:

$$\begin{bmatrix} {}^1R_m{}^e & {}^1R_m{}^e p_1^{3'} + {}^1R_m{}^e p_e^{tcf} + {}^1p_m{}^e \\ 0 & 1 \end{bmatrix} = \tag{24}$$

$$\begin{bmatrix} {}^3R_m{}^e R_3^{3'} & {}^3R_m{}^e p_e^{tcf} + {}^3p_m{}^e \\ 0 & 1 \end{bmatrix}$$

For the position components, we have:

$${}^1R_m{}^e p_1^{3'} + {}^1R_m{}^e p_e^{tcf} + {}^1p_m{}^e = {}^3R_m{}^e p_e^{tcf} + {}^3p_m{}^e \tag{25}$$

Rearranging equation (25) gives the TCF calibration:

$$({}^1R_m{}^e - {}^3R_m{}^e) p_e^{tcf} = {}^3p_m{}^3 - {}^1p_m{}^3 - {}^1R_m{}^e p_1^{3'} \tag{26}$$

Notice that frames 3' and 1 are parallel. Since the origins of the two frame are known with respect to the digitizing tablet coordinate frame (XYZ)$_D$, the stylus position 3' relative to the coordinate frame 1 can be found by the following equations.

$$T_1^{3'} = \begin{bmatrix} R_1^{3'} & p_1^{3'} \\ 0 & 1 \end{bmatrix} = T_1{}^D T_D^{3'} = [T_D^1]^{-1} T_D^{3'} \tag{27}$$

Carrying out the four by four homogeneous matrices on the right side of the equation, we have:

$$T_1^{3'} = \begin{bmatrix} \cos\theta & -\sin\theta & 0 & X_1 \\ \sin\theta & \cos\theta & 0 & Y_1 \\ 0 & 0 & 1 & 0 \\ 0 & 0 & 0 & 1 \end{bmatrix}^{-1} \begin{bmatrix} \cos\theta & -\sin\theta & 0 & X_3 \\ \sin\theta & \cos\theta & 0 & Y_3 \\ 0 & 0 & 1 & 0 \\ 0 & 0 & 0 & 1 \end{bmatrix} \tag{28}$$

$$= \begin{bmatrix} \cos\theta & \sin\theta & 0 & -X_1\cos\theta - Y_1\cos\theta \\ -\sin\theta & \cos\theta & 0 & X_1\sin\theta - Y_1\cos\theta \\ 0 & 0 & 1 & 0 \\ 0 & 0 & 0 & 1 \end{bmatrix} \begin{bmatrix} \cos\theta & -\sin\theta & 0 & X_3 \\ \sin\theta & \cos\theta & 0 & Y_3 \\ 0 & 0 & 1 & 0 \\ 0 & 0 & 0 & 1 \end{bmatrix}$$

$$= \begin{bmatrix} 1 & 0 & 0 & (X_3 - X_1)\cos\theta + (Y_3 - Y_1)\sin\theta \\ 0 & 1 & 0 & -(X_3 - X_1)\sin\theta + (Y_3 - Y_1)\cos\theta \\ 0 & 0 & 1 & 0 \\ 0 & 0 & 0 & 1 \end{bmatrix}$$

Therefore, $p_1^{3'} = \begin{bmatrix} (X_3 - X_1)\cos\theta + (Y_3 - Y_1)\sin\theta \\ -(X_3 - X_1)\sin\theta + (Y_3 - Y_1)\cos\theta \\ 0 \end{bmatrix}$ \hfill (29)

where: $\theta = \tan^{-1}\left(\dfrac{Y_2 - Y_1}{X_2 - X_1}\right)$ \hfill (30)

Equation (26) suggests that to have a non-singular solution, ${}^1R_m{}^e$ and $3R_m{}^e$ must be different. In other words, the robot last joint frame must assume different orientations for configurations 1 and 3 in calibration steps 5 and 10.

Due to robot inaccuracy, digitizing tablet resolution and numerical roundoffs, calibrations steps 5 to 13 can be repeated a number of times to establish a statistical base. The statistical average can then be used as the more accurate TCF values and the standard deviations used to quantitatively verify the TCF calibration accuracy.

TCF CALIBRATION FOR A NON-AXISYMMETRIC TOOL

Non-axisymmetric tools such as finger grippers have a unique orientation as far as the physical device is concerned. However, the coordinate system(TCF) attached to the tool with one of its axes aligned with the tool oritation does not have the capability of sensing-/locating objects or measuring calibration feature pose changes. To effectively calibrate the axisymmetric tool an additional reference calibration frame must be established with the help of external measurement devices such as a digitizing tablet, a vision camera, and a laser triangulation system. The reference calibration frame can then be utilized to trace the relative movement of the end-effectors(non-axisymmetric tools) attached to a robot link. TCF calibration of a non-axisymmetric tool determines its TCF pose (position and orientation) relative to the robot last joint frame.

Figure 12:
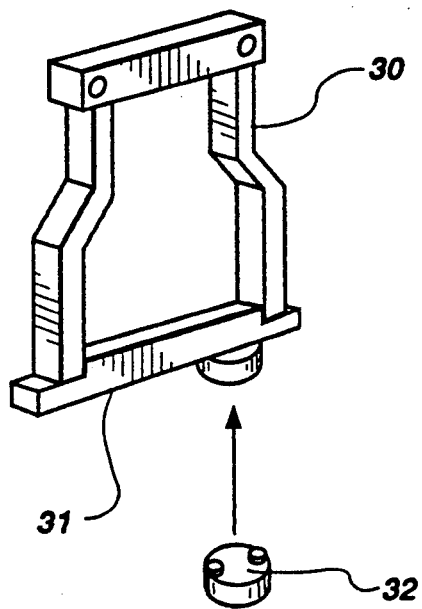
FIG. 12 graphically illustrates typical non-axisymmetric tools such as a finger gripper, a corresponding stylus adaptor and a stylus interface unit.

To demonstrate the TCF calibration method for non-axisymmetric tools, a digitizing tablet and a contact or non-contact stylus are used. TCF calibration of a non-axisymmetric tool determines its tool frame position and orientation. Two calibration configurations, "North" and "South", each having a separate calibration process, are required during calibration for the non-axisymmetric tool TCF. The two calibration processes are treated separately as two symmetric tool calibration processes described in the previous section. FIG. 12 shows a typical non-axisymmetric tool (finger gripper), the corresponding stylus adaptor and stylus interface units.

The TCF calibration procedures presented here require either minor human interaction or utilize tool changers to automate the TCF calibration processes. The TCF calibration operation proceeds as follows as set forth in FIG. 13:

1. Attach the non-axisymmetric tool to be calibrated to the robot link either manually or through a tool changer.

2. Select the appropriate stylus adaptor for the given non-axisymmetric tool.

3. Activate the non-axisymmetric tool to hold the chosen stylus adaptor as if picking up its working part such that the adaptor is in the "North" direction.

4. Carry out Axisymmetric Tool TCF Calibration Procedures to determine the "North" position coordinates $(X_1, Y_1)$ relative to the robot link frame.

5. Release the adaptor from the tool.

6. Activate the non-axisymmetric tool to hold the stylus adaptor as if picking up its working part such that the adaptor is in the "South" direction.

7. Carry out Axisymmetric Tool TCF Calibration Procedures to determine the "South" position coordinates $(X_2, Y_2)$ relative to the robot link frame.

8. Release the adaptor from the tool.

9. Carry out TCF calibration calculation using data collected in steps 4 and 7.

Figure 14:
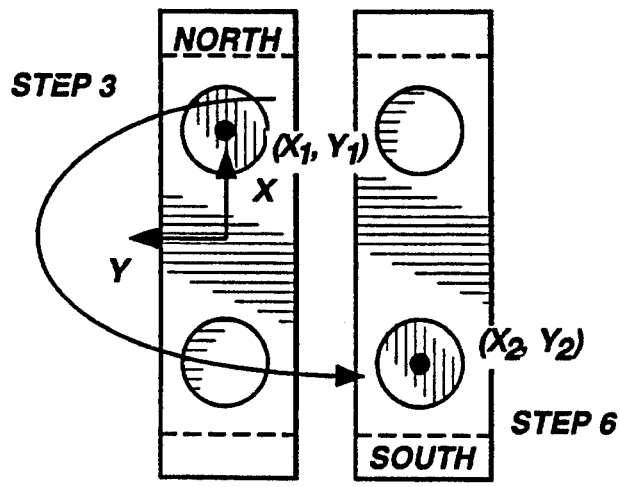
FIG. 14 illustrates the transposition of the stylus adaptor illustrated in FIG. 12 as part of the non-axisymmetric tool TCF calibration.

With the geometry information of the stylus adaptor known and two of its intermediate calibration configuration calibrated, the TCF of the non-axisymmetric tool can now be determined. For the most common case in which the two calibration points are located symmetrically on both sides of the stylus adaptor, FIG. 14, the non-axisymmetric tool TCF can be determined by equations (31)–(33).

$$X = (X_2 + X_1)/2.0 \quad (31)$$

$$Y = (Y_2 + Y_1)/2.0 \quad (32)$$

$$\theta = \tan^{-1}\left(\frac{Y_2 - Y_1}{X_2 - X_1}\right) \quad (33)$$

The TCF position calibration accuracy of a non-axisymmetric tool is the same as that of an axisymmetric tool. However, the TCF orientation calibration accuracy depends on the axisymmetric TCF position calibration accuracy, the distance between the two intermediate calibration points. It also depends on the manufacturing tolerance o the adaptor to tool interface and the adaptor-to-stylus interface.

TCF CALIBRATION FOR NON-ORTHOGONAL END-EFFECTORS

Figure 15:
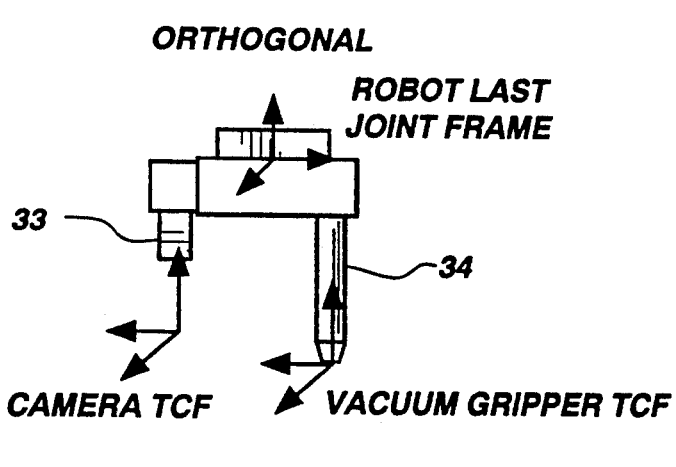
FIG. 15 shows a typical orthogonal end effector, such as a camera or vacuum gripper.
Figure 16:
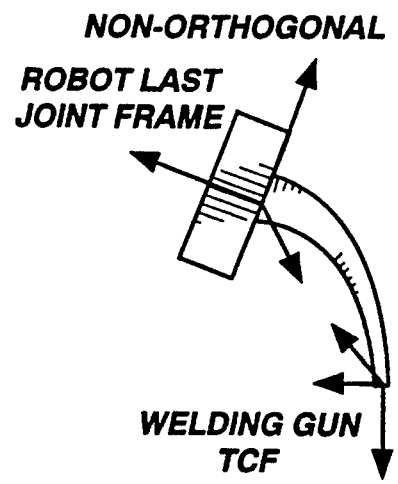
FIG. 16 graphically illustrates a non-orthogonal end effector such as a welding gun.

So far we have introduced TCF calibration methods for orthogonal end-effectors which are most commonly used in current robotic applications. An orthogonal end-effector can be characterized as having one of its TCF axis parallel to that of the robot link frame, while the TCF of a non-orthogonal end-effector could be in any pose (position and orientation) relative to the robot link frame. A vision camera and a vacuum gripper mounted for vertical assembly operations are typical orthogonal end-effectors, see FIG. 15. A welding gun, on the other hand, is a typical non-orthogonal end-effector, FIG. 16. In this section TCF calibration techniques for non-orthogonal end-effectors will be presented and possible ways of the TCF calibration automation for this category of end-effectors will be discussed.

Like orthogonal end-effectors, there are basically two types of non-orthogonal end-effectors. The first type has the capability of sensing/locating workcell objects, and TCF calibration can be readily carried out taking advantage of the coordinates frames embodied in the end-effectors. Most measurement devices such as a vision camera belong to this group. The other type of the non-orthogonal end-effector does not have sensing capability, and the TCF calibration requires an additional reference calibration frame. TCF calibration techniques for the two types of non-orthogonal end-effectors are similar, but different robot relative movements must be conducted to establish spatial relationship between the robot and the workspace environment. TCF calibration strategies for the non-orthogonal end-effectors are presented here. TCF calibration of a vision camera and a welding gun will be used to represent the calibration of the two types of the end-effectors.

We will first present calibration procedures, the transformation equation derivation, and equation solving approaches for a vision camera. The same for a welding gun calibration will then be presented with emphasis on the calibration procedures and the transformation equation derivation. The TCF calibration of a non-orthogonal vision camera FIG. 17 proceeds as follows:

1. Attach the vision camera to be calibrated to the robot link in its normal working position.

2. Place a calibration plate or template with calibration features in the robot workspace.

3. Jog the robot such that the camera is near normal to the calibration surface and the calibration feature is in the vision window and being focused, FIG. 18. We will call this configuration 1.

4. Activate the vision system to take a picture and process the image, record the feature pose $(X_{v1}, Y_{v1}, \theta_{v1})$ in the vision coordinate frame $(XYZ)_v$ at configuration 1.

5. Record current robot configuration in the form of a set of joint angles or a homogeneous transformation relating the last joint frame $(XYZ)_v$ to the robot base frame $(XYZ)_m$.

6. Jog the robot such that the camera is near normal to the calibration surface and the calibration feature is in the vision window and being focused. If the same calibration feature as used in step 3 is used, the camera must be so positioned such that the feature is in a different pose relative to the vision coordinate frame. We will call this configuration 2, FIG. 19. If a different feature is used, then the spatial relation between the first feature and the second feature must be known a priori, either from the workcell data base or from the calibration plate manufacturing specifications.

7. Activate the vision system to take a picture and process the image, record the feature pose ($X_{v2}$, $Y_{v2}$, $\theta_{v2}$) in the vision coordinate frame $(XYZ)_v$ at configuration 2.

8. Record current robot configuration in the form of a set of joint angles or a homogeneous transformation relating the last joint frame $(XYZ)_e$ to the robot base frame $(XYZ)_m$.

9. Carry out TCF calibration calculation using data collected in steps 4, 5, 7, and 8.

Figure 18:
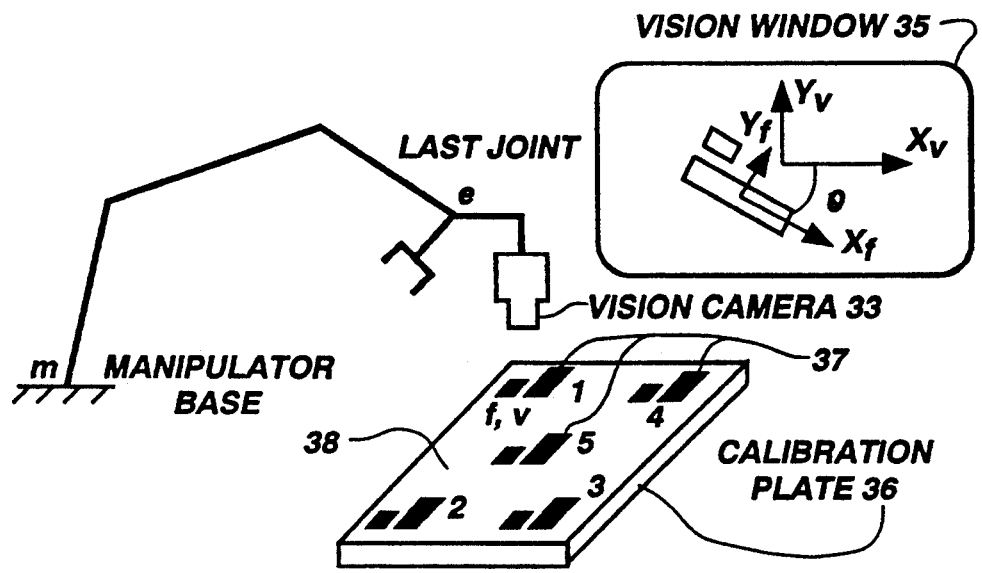
FIG. 18 shows a first configuration for the calibration procedure for the non-orthogonal camera.

From FIG. 18 the relative transformation from the calibration feature frame $(XYZ)_f$ to the robot base frame $(XYZ)_m$ can be found as the matrix product of the transformation from the feature frame to the vision camera frame and the transformation from the vision camera frame to the robot last joint frame, premultiplied by the transformation from the robot last joint frame to the robot base frame, equation $$T_m{}^f = {}^1T_m{}^e T_e{}^v T_v{}^{f1} \tag{34}$$

The transformation from the feature frame to the vision camera frame can be constructed using ($X_{v1}$, $Y_{v1}$, $\theta_{v1}$), equation (34), while the transformation from the robot last joint frame to the robot base frame is known from the robot configuration saved in step 5, and the transformation from the vision frame to the robot last joint frame is the TCF matrix to be determined.

$$T_v{}^{f1} = \begin{bmatrix} \cos\theta & -\sin\theta & 0 & X_{v1} \\ \sin\theta & \cos\theta & 0 & Y_{v1} \\ 0 & 0 & 1 & 0 \\ 0 & 0 & 0 & 1 \end{bmatrix} \tag{35}$$

Figure 19:
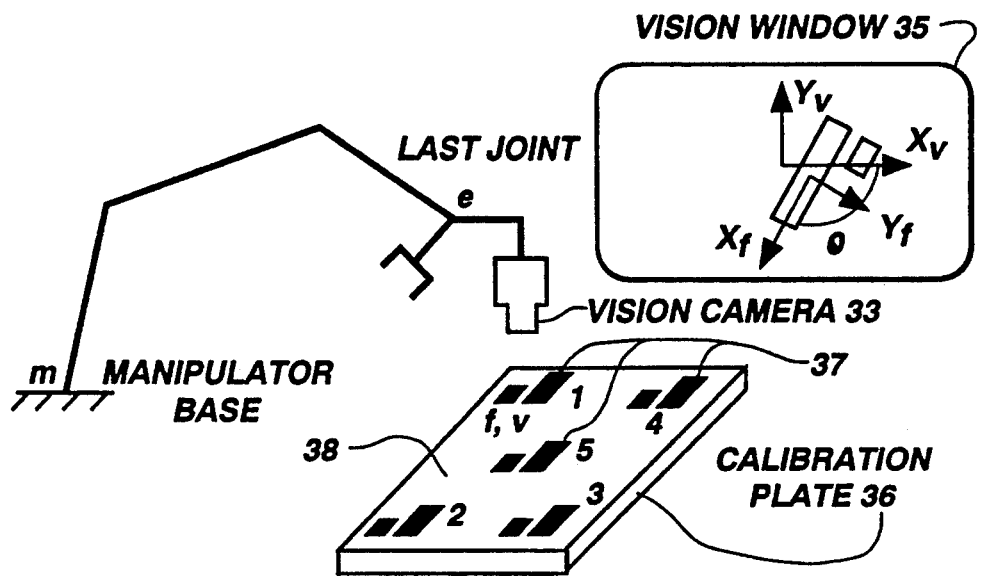
FIG. 19 shows a second configuration for the non-orthogonal camera calibration.

Similarly, from FIG. 19 the relative transformation of the calibration feature frame with respect to the robot base frame can be found, equation (36).

$$T_m{}^f = {}^2T_m{}^e T_e{}^v T_v{}^{f2} \tag{36}$$

where:

$$T_v{}^{f2} = \begin{bmatrix} \cos\theta & -\sin\theta & 0 & X_{v2} \\ \sin\theta & \cos\theta & 0 & Y_{v2} \\ 0 & 0 & 1 & 0 \\ 0 & 0 & 0 & 1 \end{bmatrix} \tag{37}$$

During the calibration processes the calibration plate stays fixed relative to the robot base frame, which implies that the transformation from the calibration feature frame to the robot base frame is a constant transformation. Therefore, from equations (34) and (36), we will have:

$${}^1T_m{}^e T_e{}^v T_v{}^{f1} = {}^2T_m{}^e T_e{}^v T_v{}^{f2} \tag{38}$$

Rearranging gives:

$$(^2T_m{}^e)^{-1}{}^1T_m{}^e T_e{}^v = T_e{}^v T_v{}^{f2}(T_v{}^{f1})^{-1} \tag{39}$$

$(^2T_m{}^e)^{-1}{}^1T_m{}^e$ can be interpreted as the relative motion of the robot last joint frame from configuration 1 to configuration 2, which can be calculated using robot configurations save in calibration steps 5 and 8. Let's denote it as matrix A, equation (40). Similarly, $T_v{}^{f2}(T_v{}^{f1})^{-1}$ can be interpreted as the relative motion of the vision camera frame from configuration 1 to configuration 2, which can be determined by equations (35) and (37). Let's denote it as matrix B, equation (41). $T_e{}^v$ is the unknown TCF matrix, and we denote it as matrix X, equation (42).

$$A = (^2T_m{}^e)^{-1}{}^1T_m{}^e \tag{40}$$

$$B = T_v{}^{f2}(T_v{}^{f1})^{-1} \tag{41}$$

$$X = T_e{}^v \tag{42}$$

Substituting equations (40), (41), and (42) into equation (39) gives the calibration transformation equation in the form AX=XB. Next we will discuss approaches available to solve this homogeneous transformation equation.

Shiu, Y. C. and S. Ahmad, "Calibration of Wrist-Mounted Robotic Sensors by Solving Homogeneous Transform Equations of the Form AX=XB," IEEE Transactions on Robotics and Automation. Vol. 5, No. 1, February 1989, pp. 16-29, demonstrated that the solution to an equation of form AX=XB has one degree of rotational freedom and one degree of translational freedom if the angle of rotation of A is neither 0 nor $\pi$ radians. To solve for X uniquely, it is necessary to make two robot arm movements and form a system of two equations of the form: A1X=XB1 and A2X=XB2, where A1 is the relative motion of the robot last joint frame and B1 is the relative motion of the vision camera frame in the first robot movement, and A2, B2 are the corresponding relative motions of the robot last joint frame and the vision camera frame in the second robot movement. The two robot movements must have distinct axes of rotation and their angles of rotation must not be 0 or $\pi$ in order to guarantee a unique solution Detailed equation solving procedures for this system of two equations can be found in Shiu.

The homogeneous transformation equation AX=XB can be divided into its rotational and translational components, equations (43) and (44). The rotational and translational components of X can be solved separately.

$$R_A R_X = R_X R_B \tag{43}$$

$$R_A P_X + P_A = R_X R_B + P_X \tag{44}$$

Chou, J. C. K. and M. Kamel, "Quaternions Approach to Solve the Kinematic Equation of Rotation, $A_a A_x = A_x A_b$, of a Sensor-Mounted Robotic Manipulator," Proceedings of IEEE International Conference on Robotics and Automation, 1988, pp. 656-662, proposed quaternions approach to solve the equation of rotation (43). A quaternion, a, is defined as a complex number, $$a = a_0 + a_1 i + a_2 j + a_3 k \tag{45}$$

formed from four different units (1,i,j,k) by means of the real parameters $a_i$ (i=0,1,2,3). The rotational equation (43) is first transformed to its equivalent form in terms of quaternions and then simplified to a well-structured linear system of equations of the form Bx=0. It turned out that B is rank-deficient and the solution is, therefore, not unique. Two distinct robot movements are also required in order to obtain a unique solution A method for obtaining a unique solution is proposed where a system of non-linear equations is solved using Newton-Raphson iteration. The detailed implementation of the proposed approach can be found in Chou, J. C. K. and M. Kamel, "Quaternions Approach to Solve the Kinematic Equation of Rotation, $A_aA_a=A_aA_b$, of a Sensor-Mounted Robotic Manipulator," Proceedings of IEEE International Conference on Robotics and Automation, 1988, pp. 656-662.

Figures 20, 21:
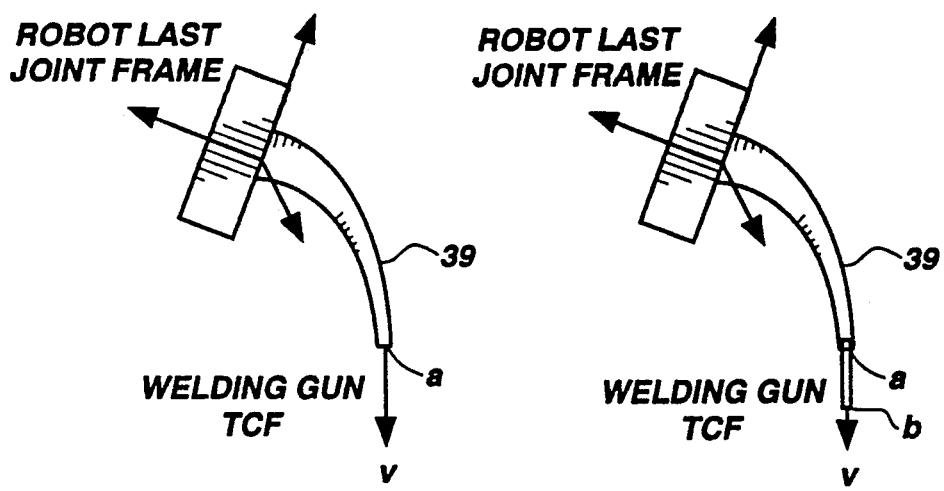
FIG. 20 graphically illustrates TCF calibration of a welding gun without a fixed calibration fixture.
FIG. 21 illustrates the calibration of a welding gun with a calibration fixture.

The TCF of a welding gun can be characterized as a vector pointing out from the welding tip, FIG. 20. The TCF calibration of a welding gun must determine the positions of points a and b attached to the welding direction v relative to the robot last joint frame. Point a sits right on the welding tip, while point b is attached to the calibration fixture which can slide in and out along the welding vector v. We will present procedures to determine the position of a welding tip, a, and the position of point b can be determined similarly. This is also depicted in FIG. 22.

1. Attach the welding gun to be calibrated to the robot link in its normal working position
2. Place a calibration block/template with calibration holes in the robot workspace.
3. Jog the robot such that the welding tip, point a, is centered at the calibration hole on the calibration block. We will call this configuration 1.
4. Record current robot configuration in the form of a set of joint angles or a homogeneous transformation relating the last joint frame $(XYZ)_e$ to the robot base frame $(XYZ)_m$.
5. Jog the robot to another configuration, configuration 2, yet have the welding tip centered at the same calibration hole as the one used in step 3.
6. Record current robot configuration in the form of a set of joint angles or a homogeneous transformation relating the last joint frame $(XYZ)_e$ to the robot base frame $(XYZ)_m$.
7. Carry out calibration calculation for welding tip position using data collected in steps 4 and 6.

Equation (46) can be derived for calibration steps 3 and 4, and equation (47) can be derived for calibration steps 5 and 6. Since the calibration block is held fixed with respect to the robot base frame during the calibration process, the welding tip positions in both configuration 1 and configuration 2 are same, equation (48).

$$T_m{}^a = {}^1T_m{}^eT_e{}^a \tag{46}$$

$$T_m{}^1 = {}^2T_m{}^eT_e{}^a \tag{47}$$

$${}^1R_m{}^ep_e{}^1 + {}^1p_m{}^e = {}^2R_m{}^ep_e{}^a + {}^2p_m{}^e \tag{48}$$

Rearranging equation (48) gives the TCF calibration equation:

$$({}^1R_m{}^e - {}^2R_m{}^e)p_e{}^a = {}^2p_m{}^e - {}^1p_m{}^e \tag{49}$$

The calibration procedures can be repeated a number of times to establish a statistical base for optimal calibration results. The calibration method requires human interaction in the calibration process.

The TCF calibration accuracy depends on the accuracy and resolution of both calibration measurement devices and the robot on which the end-effectors are attached. For example, vision camera TCF calibration accuracy depends on the resolution and accuracy of the robot, the resolution of the CCD array, and the accuracy of the pixel calibration which in turn is a function of the camera resolution and manufacturing tolerance of the image features used. The accuracy of the TCF calibration applying digitizing tablet depends on the resolution and accuracy of the digitizing tablet, and the resolution and accuracy of the robot. Fortunately, robot inaccuracy in localized regions is relatively small and statistically distributed. Statistical methods used in TCF calibration average out the uncertainty, and the final TCF calibration results meet the desired tolerance requirements.

Figure 23:
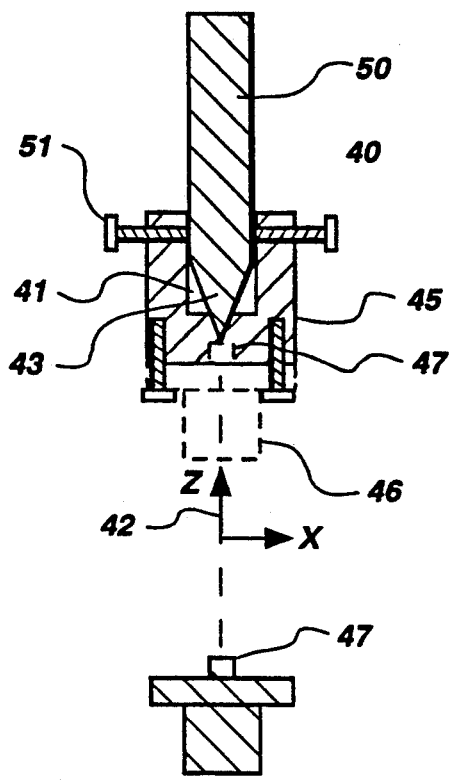
FIG. 23 shows a sample calibration interface device useful with a pointer tool and digitizing tablet.

Previous reference has been made to the use of a digitizing plate or tablet and a detector probe. For example, calibration of a pointer tool can be accomplished by mounting a probe to the tool using a calibration interface device as is shown in FIG. 23. This device includes a mounting end 40 including a receiving port 41, said port having a vertical Z axis 42 and being configured to snugly receive the terminal end of the tool 43 within the port with the Z axis of the port in alignment with a Z axis of a TCF associated with the tool.

An interface body 45 extends downward from the mounting end 40 and includes a probe 46 useful as part of the calibration procedure to calibrate the TCF of the tool. The probe 46 includes a centering stub 47 indentation therein with a single centering point located on the Z axis extending from the receiving port, said indentation being configured to receive and seat the pointed terminal end and urge the Z axis of the tool into exact alignment with the Z axis of the interface device.

This probe and calibration digitizing plate are used to determine the X and Y positions of the probe. The interface should be capable of positioning the probe frame origin in line with the TCF Z axis within desired tolerances and as close to the TCF as possible. The centering point or pin is used to line the probe center up with the tool interface unit, insuring exact alignment of the Z axis.

As previously noted, the non-axisymmetric tool calibration process is slightly different from the axisymmetric tool. Since the TCF may not be located on the tool itself, as in the case of a finger gripper, it is necessary to use an averaging approach to determine the probe X and Y locations. These X and Y locations are then used to determine the pose of the TCF relative to the link frame. Since the non-axisymmetric tool calibration requires the determination of the TCF orientation, the interface must not rotate or translate once it is secure to the tool.

Figure 24A:
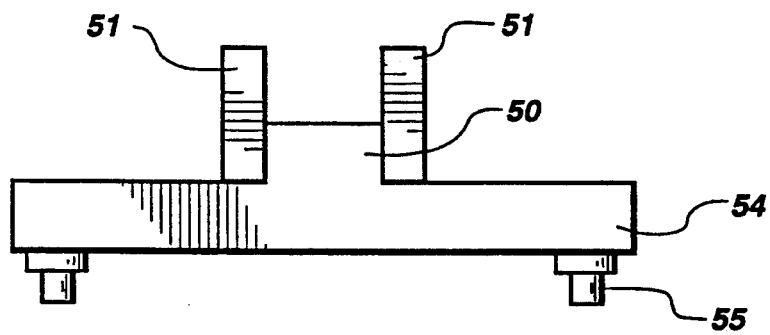
FIG. 24 illustrates a calibrating interface device for use with a non-axisymmetric tool such as a pair of finger grippers.
Figure 24B:
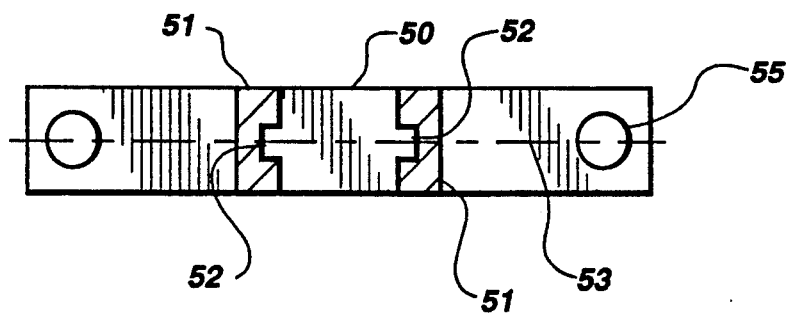

A calibrating interface device for use with a non-axisymmetric tool is shown in FIG. 24 and comprises a grippable top member 50 configured for capture between finger grippers 51 such as might be attached to a terminal joint of a robot, said grippable member including vertically oriented tongue or groove structure 52 positioned within a single plane 53 in opposing 180 degree relationship and configured to engage corresponding groove or tongue structure associated with the finger grippers. A probe support member 54 is rigidly attached to the top member and extends horizontally thereunder, said support member 54 including means for attachment of a probe 55 useful with a digitizer plate as part of the calibration method. The probe is attached to the support member and extends downward therefrom in a configuration suitable for use in the TCF calibration method. This probe has a Z axis parallel to the TCF Z axis and intersects the X axis of the TCF.

The TCF X and Y positions are determined by averaging two probe location values In obtaining these probe values, two methods can be used. First, the probe may be moved or second, the interface may be rotated. The first method involves creating two attachment locations on a symmetric interface for the probe and moving the probe from one location to the other. The probe locations should be an equal distance from the TCF origin and on the TCF X axis.

The automatic TCF calibration methods introduced in this patent have been implemented and tested in a robotic workcell for vertical assembly. FIGS. 25 and 26 illustrate lists of the TCF calibration results for a vision camera and a vacuum gripper respectively. Each item in FIG. 25 and FIG. 26 is the statistical average of eight independent tests. From FIG. 25, it can be concluded that the camera is calibrated to within 0.001 inch ($3\sigma$) of its true position, and to within 0.23 degree ($3\sigma$) of its true orientation. Likewise, from FIG. 26, it can be concluded that the vacuum gripper is calibrated to within 0.0013 inch ($1\sigma$) or 0.004 inch ($3\sigma$) cf its true position.

The calibration process only takes less than three minutes per end-effector, and the calibrated TCF pose is used to automatically update corresponding CAD/CAM data base. This is a remarkable contrast to the hours or days that prior methods of calibration required. The simplicity of this improved technique can enable adaptation of off line programming to many robot applications that have previously been uneconomical or otherwise impractical.

It will be understood that the disclosure of previous embodiments and methods is only by way of example, and is not to be considered limiting, except as set forth in the following claims.

We claim:

1. A method for calibrating a tool control frame (TCF) of a robot with respect to a known calibration reference frame (CRF), which CRF moves with and is associated with a robot link in rigid body relationship, said method comprising the steps of:

a) attaching a sensory tooling assembly to a link of the robot in rigid body relationship, which link has a known positional and orientational relationship with respect to the CRF and which allows for feedback of positional and/or orientational information with respect to a sensory reference frame associated with the sensory tooling assembly;

b) calibrating the sensory tooling assembly and any data output systems associated with the tooling assembly to enable sensor output in units capable of defining physical dimensions;

c) identifying a calibration feature separate from the robot which is capable of being mapped by the sensory tooling assembly;

d) causing relative movement of the calibration feature and sensory tooling assembly to bring the calibration feature within sensing range without need of manually jogging the sensory tooling assembly to a specific alignment position with respect to the calibration feature;

e) recording robot configuration and new relative position and orientation (pose) of the calibration feature with respect to the sensory reference frame as an initial configuration data record;

f) causing relative movement of the calibration feature and sensory tooling assembly along a known direction such that the calibration feature and sensory tooling assembly are still within sensing range;

g) recording robot configuration and new relative location and orientation of the calibration feature with respect to the sensory reference frame as a secondary configuration data record;

h) determining if the orientation of the secondary configuration is the same as the orientation of the initial configuration data record;

i) if the orientation of the initial and secondary configurations are the same, an additional orientational change is required and is accomplished and recorded by causing relative movement of the calibration feature and the sensory tooling assembly such that the calibration feature has a different orientation from the orientation as determined in the initial and secondary data records, and recording robot configuration and new relative location and orientation of the calibration feature with respect to the sensory reference frame as a third configuration data record;

j) applying coordinate transformations to the initial and secondary configuration data records, and to the third configuration data record if required, to generate a correct tool control frame (TCF) pose with respect to the CRF.

2. A method as defined in claim 1, wherein steps c) through j) are repeated to develop a statistical average of data representing a more accurate definition of pose for the TCF.

3. A method as defined in claim 1, wherein step a) comprises the more specific step of attaching a vision sensory tooling assembly including a camera to a link of the robot in rigid body relationship, which link has a known positional and orientational relationship with respect to the CRF and which allows for feedback of positional and/or orientational information with respect to a sensory reference frame associated with the sensory tooling assembly, which sensory reference frame is physically located in a focal plane of the camera.

4. A method as defined in claim 3, wherein the TCF calibration is accomplished by the following steps:

a) placing a calibration plate having a calibration dot in sensing range of the camera, b) adjusting the camera to a near normal orientation with respect to the calibration plate, c) moving the robot arm to a position such that the calibration dot will appear near a center portion of a vision window of the camera, comprising the initial configuration, d) activating the vision assembly to take a picture of the calibration dot and processing the image to record dot coordinates in sensory reference frame, e) recording current robot configuration as a set of joint angles or homogeneous transformation relating link joint frame to robot base frame, f) moving the robot along a direction and retaining the dot in the vision window, representing the secondary configuration, the image, recording dot coordinates in the sensory frame, h) recording current robot configuration as a set of joint angles or homogeneous transformation relating link frame to robot base frame, i) moving the robot to a third configuration if necessary wherein dot coordinates are in the sensory reference frame to obtain a new orientation and recording current robot configuration, and j) applying transformations to collected data to determine TCF calibration.

5. A method as defined in claim 4, wherein the step of calibrating the sensory tooling assembly comprises the steps of determining the aspect ratio and size of each pixel dot of the camera to define the correct physical dimensions represented by data output from the sensory tooling assembly.

6. A method as defined in claim 5, further comprising the more specific steps of:
   a) developing initial calibration for the pixel aspect ratio and pixel sizes using a circular calibration dot with known diameter;
   b) recording the initial calibration to update vision system pixel parameters within a workcell database;
   c) processing automatic vision camera TCF calibration using initial pixel calibration to initially calibrate the vision camera TCF;
   d) repeatedly moving the vision camera around the calibration dot whose parameters have been recorded in the workcell data base with a unique offset angle to build up new statistical calibration data for a precise pixel calibration;
   e) statistically averaging the new calibration data and updating the vision system with new pixel parameters based on the new calibration data; and
   f) conducting automatic vision camera TCF calibration with the new calibrated pixel parameters.

7. A method as defined in claim 1, wherein the steps of the invention include locating the TCF such that it can be superimposed over the target frame when an end effector is applied at the feature or part to be operated on.

8. A method as defined in claim 1, wherein the steps of the invention include locating the TCF at a point of action including a tip of an axisymmetric vacuum gripper.

9. A method as defined in claim 1, wherein the steps of the invention include locating the TCF at a point of action including a tip of an axisymmetric touch probe.

10. A method as defined in claim 1, wherein the steps of the invention include locating the TCF at an intermediate point of symmetry in association with a finger gripper.

* * * * *